United States Patent [19]
Chao

[11] Patent Number: 5,778,170
[45] Date of Patent: Jul. 7, 1998

[54] DATA PROCESSING SYSTEM WITH INTEGRAL DIAGNOSTIC PROCEDURE

[75] Inventor: Ken Chao, Boise, Id.

[73] Assignee: Hewlett-Packard Company, Palo Alto, Calif.

[21] Appl. No.: 601,410

[22] Filed: Feb. 14, 1996

[51] Int. Cl.$^6$ ................................................ G06F 11/00
[52] U.S. Cl. .......................... 395/183.16; 395/183.13
[58] Field of Search ..................... 395/183.01, 183.12, 395/183.13, 183.14, 183.16, 183.21

[56] References Cited

U.S. PATENT DOCUMENTS

| | | | |
|---|---|---|---|
| 4,729,124 | 3/1988 | Hansel et al. | 395/183.12 |
| 5,068,851 | 11/1991 | Bruckert et al. | 395/183.12 |
| 5,448,722 | 9/1995 | Lynne et al. | 395/183.12 |
| 5,572,664 | 11/1996 | Bujanos | 395/183.01 |

*Primary Examiner*—Albert T. Decady

[57] ABSTRACT

A diagnostic method enables a determination of which of a plurality of data processing modules is at fault in a chain of data processing modules extending between an input and an output. The method includes the steps of reinputting a user (e.g., test) file that has failed to print, to a diagnostic software module which appends a diagnostic indicator to the test file. The diagnostic module and the remaining data processing modules are then operated to process the test file from the input to the output. The diagnostic module monitors operations of the data processing modules and forces one of the data processing modules that is intermediate a first module in the chain and a last module in the chain, to respond to the diagnostic indicator by writing processed results of the test file into a memory file. The diagnostic module then determines if the memory test file exists and, if yes, further checks operations of data processing modules which lie between the intermediate module and the output. If no, the diagnostic module checks operations of data processing modules lying between the intermediate module and the input. In such manner, the diagnostic search begins from an intermediate module in the chain and proceeds in the direction of the fault location.

4 Claims, 2 Drawing Sheets

DATA PROCESSING SYSTEM WITH INTEGRAL DIAGNOSTIC PROCEDURE

FIELD OF THE INVENTION

This invention relates to methods for diagnosis of malfunctions in data processing systems and, more particularly, to a method for localizing a fault in a data processing system wherein an input file is transmitted over a network to a connected printer.

BACKGROUND OF THE INVENTION

Preparation and transfer of a file to be printed to a printer involves a number of complex data processing actions. In addition to the physical printer which outputs the printed page or pages, a number of system software components must operate appropriately to assure a successful print output. In a UNIX environment, those software components include a spooler, a filter, a network driver, interface programs, etc. Further, hardware modules must also operate appropriately to assure the proper functioning of the software components and the successful transmission of the print data.

In general, the most difficult part of fixing a malfunction is locating the module which includes the problem. Once the module has been located wherein the problem exists, the problem can be remedied. To perform this task remotely renders it even more difficult.

Commonly found printing-related diagnostics generally comprise either a collection of disjoint utilities or a chapter (or chapters) of a hard copy manual which attempts to instruct the user on a diagnostic routine. In general, such diagnostics assume that the user already knows which software/hardware component is at fault. However, from the user's perspective, what is known is that a job was sent for printing and that the output is incorrect. The user does not know where in the chain of modules, the problem exists.

Accordingly, it is an object of this invention to provide an improved method and apparatus for enabling diagnosis of the location of a problem in a multi-modular data processing system.

It is another object of this invention to provide a method and apparatus for a diagnosis of problems wherein the diagnostic procedure utilizes a binary search technique to reduce the time required to locate the malfunction.

It is yet another object of the invention to provide a diagnostic method which enables the unschooled user to isolate a software/hardware module which is at fault in a network-oriented printing system.

SUMMARY OF THE INVENTION

A diagnostic method enables a determination of which of a plurality of data processing modules is at fault in a chain of data processing modules extending between an input and an output. The method includes the steps of reinputting a user file that has failed to print, to a diagnostic software module which appends a diagnostic indicator to the user file. The diagnostic module and the remaining data processing modules are then operated to process the user file from the input to the output. The diagnostic module monitors operations of the data processing modules and forces one of the data processing modules that is intermediate a first module in the chain and a last module in the chain, to respond to the diagnostic indicator by writing processed results of the user file into a memory file. The diagnostic module then determines if the memory file exists and, if yes, further checks operations of data processing modules which lie between the intermediate module and the output. If no, the diagnostic module checks operations of data processing modules lying between the intermediate module and the input. In such manner, the diagnostic search begins from an intermediate module in the chain and proceeds in the direction of the fault location.

DETAILED DESCRIPTION OF THE INVENTION

This invention will hereafter be described in the context of a host computer feeding a print job, via a network to a connected printer. However, it is to be understood that the invention is more broadly applicable to various host/network/peripheral interconnections.

Figure 1:
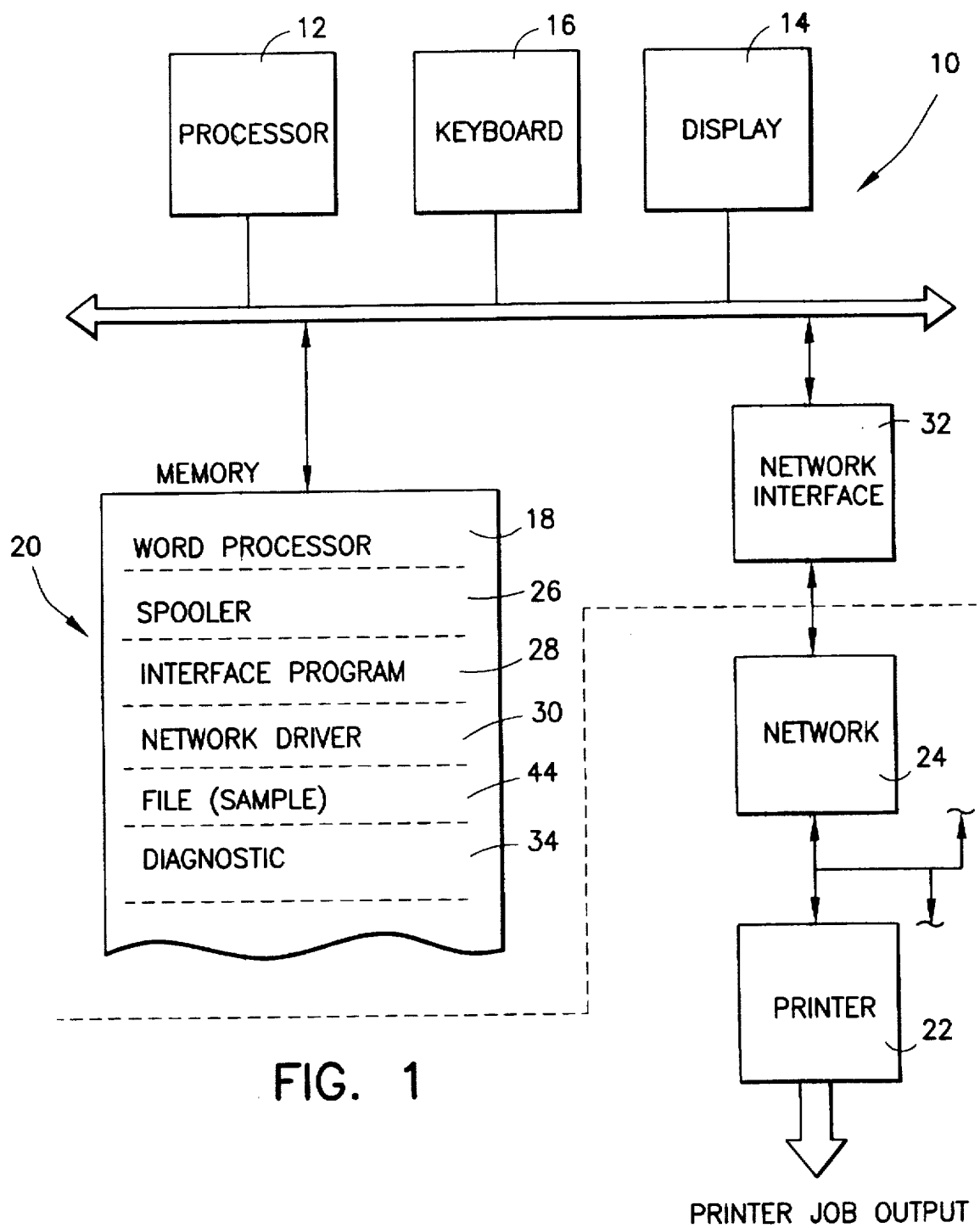
FIG. 1 is a high level block diagram of a data processing system illustrating the hardware and software components which are involved in the carrying out the diagnostic method of the invention.

Referring to FIG. 1, a host computer 10 includes a processor 12, display 14 and keyboard 16. These elements enable a user to input a print job in accordance with a word processing software procedure 18 stored in memory 20. Assuming that host computer 10 is interconnected to a printer 22 via a network 24, a number of network-related software modules are maintained by host computer 10 to enable transfer of print jobs to printer 22.

Assuming that host computer 10 is operating in a UNIX environment, a spooler utility 26 is maintained in memory 20 and provides both a queuing and scheduling function for print jobs that are awaiting transmission to printer 22. An interface program 28 enables print jobs to be accessed from spooler procedure 26 and to be passed to a network driver 30, which appends the necessary information to enable the print job to be directed by network 24 to a selected printer 22. Network driver 30 transmits the print job to network interface hardware module 32 which then emplaces the print job on network 24 for transmission to printer 22.

In the event that printer 22 does not provide an expected print job output, and the reason for the print job failure is not readily apparent (such as printer-out-of-paper, paper jam, etc.), the user is enabled to initiate a diagnostic software procedure 34 which, in combination with the operational portions of host computer 10, performs a fault location action.

Figure 2:
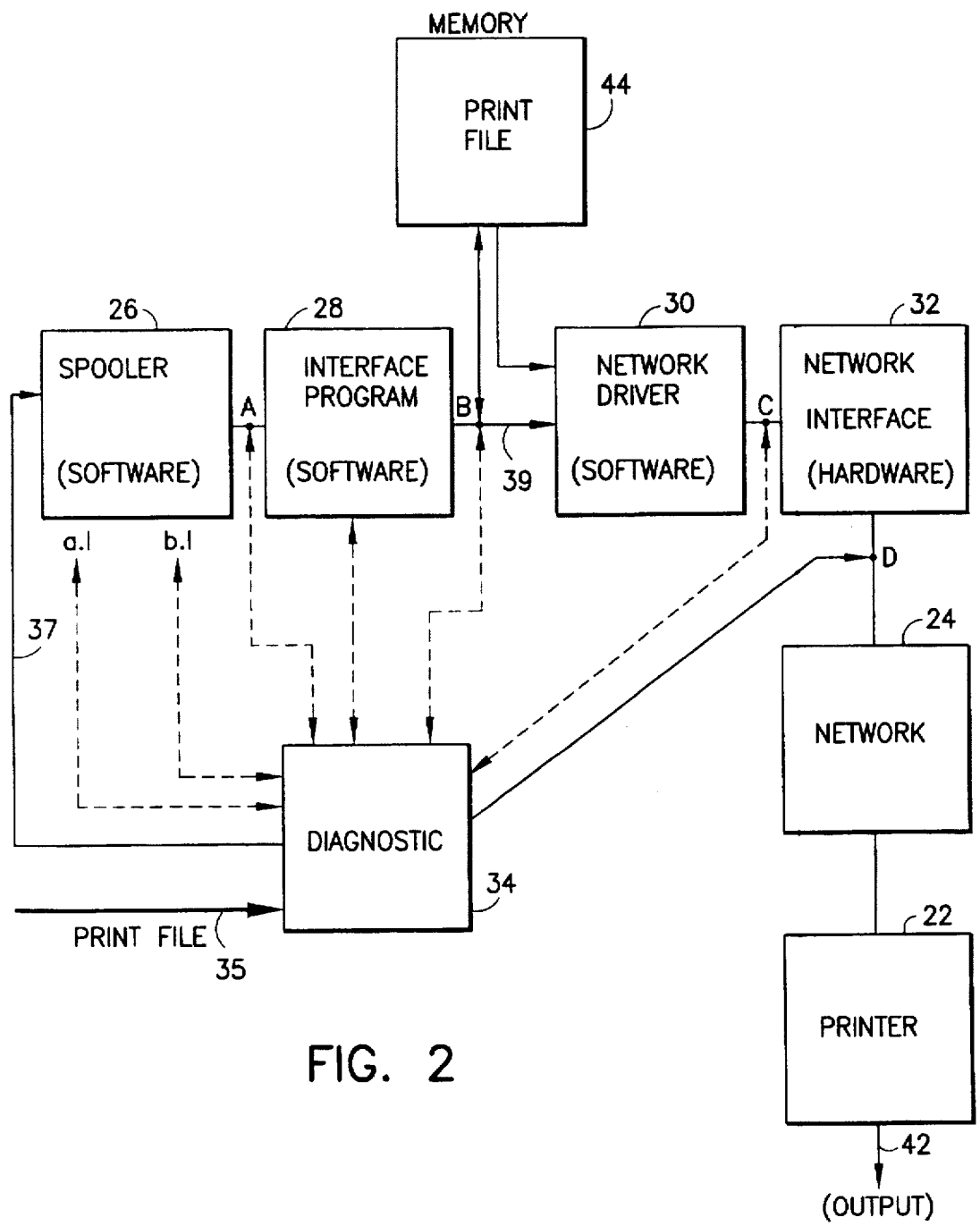
FIG. 2 is a schematic diagram showing the software and hardware components which comprise the data path taken by a user print job and, further, showing the operation of a diagnostic routine which enables location of the source of an error in the chain of data processing modules.

Diagnostic procedure 34 monitors operations of each of the software and hardware modules at each of a plurality of checkpoints in the data flow path shown in FIG. 2. In addition, within certain software modules, diagnostic procedure 34 is able to look at internal checkpoints during the processing. The indicated lines between diagnostic procedure 34 and the various modules are merely indicators that diagnostic procedure 34 is able to insert itself into the program flow at a particular point to extract data therefrom, or to control data flow at that point.

The schematic of FIG. 2 illustrates the application of diagnostic procedure 34 to a route of travel of a print job through various software and hardware modules which comprise the data processing system. Assuming that execution of a print job has been unsuccessful and that the system is operating in a UNIX environment, the user calls diagnostic program 34 into action. Thereafter, the user inputs, preferably, the same print file from word processing procedure 18 which was unsuccessful in printing. The print file is initially passed to diagnostic procedure 34, via input line 35. There, a diagnostic indicator (e.g., "-odebugm") is appended to the print file. The print file is then sent via line 37 to a spooler 26 where it is queued in a selected queue for transmission. Assume that the queue is named "lj4siq".

In a normal print operation, with diagnostic procedure 34 disabled, upon command from interface program 28, spooler 26 would next feed the print file through interface program 28 to network driver 30 where it would be prepared for transmission onto network 24. When appropriate routing data had been appended by network driver 30, the print job would be passed to network interface hardware module 32 and then be transmitted, via network 24 to printer 22.

Because, however, diagnostic procedure 34 is enabled, a number of checkpoints A–D are established in the data flow path of FIG. 2. Further, data flow path 39 is interrupted between Interface program 28 and network driver 30, and print file data from interface program 28 is rerouted to memory 44.

Initially, diagnostic procedure 34 monitors data flow at checkpoint B which, as can be seen, is inter- mediate input 40 and output 42. Diagnostic procedure 34 further monitors data flow in interface program 28 and, upon sensing the "-odebugm" indicator, inhibits the transfer of the partially processed Sample file to network driver 30 and further causes its storage in memory area 44.

Note that the output of interface program 28 is approximately midway between input 40 and output 42, thereby enabling commencement of a binary fault location procedure.

The fault location operation commences when diagnostic procedure 34 inserts the print file into a queue within spooler 26. Interface program 28 then accesses the print file and, upon diagnostic procedure 34 determining that the diagnostic designator "-odebugm" is appended thereto, causes interface program 28 to feed the print file to memory area 44. If diagnostic procedure 34 were not operational, the print file would be fed directly to network driver 30, and thence to network interface hardware 32, etc., finally arriving at printer 22 for output.

At checkpoint B, the following checks are performed:

B1 The existence of the print file is checked (the user is not involved).

B1.1 If the print file is found to exist, the correctness of the print file's contents are checked (go to step B.2).

B1.2 If the print file does not exist, the problem is before checkpoint B and the diagnostic procedure moved to checkpoint A.

B2 Either a summary or the full contents of the print file are displayed, and the user is requested to determine the correctness of the print file.

B2.1 If the print file is correct, the left side of checkpoint B has no problem. The procedure moves to checkpoint C.

B2.2 If the contents of the print file are incorrect, the problem is in interface program software 28 and the procedure is complete.

Checkpoint A. The procedure moves to this check- point as a result of B1.2 above and initially checks if queue "lj4siQ" is enabled.

A1. If the aforesaid queue is not enabled, the interface program in interface program software module 28 will not be invoked. Therefore, the problem has been located.

A2. If the aforesaid queue is enabled, the procedure moves to checkpoint a.1.

Checkpoint a.1 (the result of A2 above). Herein, the operational state of spooler software 26 is checked to determine if it is running.

a.1.1 If the spooler is not running, the problem has been located, as the print file will stay in the queue and nothing further will happen.

a.1.2 If the spooler is running, the process proceeds to checkpoint b.1.

Checkpoint b.1: (this is the result of a.1.2). Herein, permissions are checked on related files and directories. Permissions determine who can run the program, who can read/write a particular file, etc. One wrong permission can stop the entire printing process.

b.1.1 If any permission is found to be in error, the problem has been found and the procedure exits.

b.1.2 If the permissions are found to be proper, then the problem is elsewhere and outside help must be requested.

At this point, all checkpoints to the left of checkpoint B have been interrogated and, excluding the outcome defined in b1.2, the problem should have been located. However, if the determination at checkpoint B above (see B2.1) was that the print file was accurate, diagnostic procedure 34 moves to the right of checkpoint B (e.g. checkpoint C). There, the user is instructed to determine if the network cable is properly connected and the printer is powered.

C.1 If the network is not O.K., the network/printer is the problem and the procedure terminates.

C.2 If the network is O.K., diagnostic procedure 34 proceeds to further interrogate data within network driver 30. Initially, the given printer address for the network printer is checked. If the network printer address is found to be O.K., it is next determined whether network driver 30 actually has access to the addressed printer. Thus, if the printer is configured to deny access to host processor 10, then, irrespective of the appropriate functioning of host processor 10, the print file will fail.

If it is determined that host processor 10 is able to access printer 22, the operability of network driver 30 is thereafter tested (to determine if it is running or not). As part of this action, the print file stored in memory area 44 is transmitted to printer 22. If the print file cannot be sent, then it is known that network driver 30 is at fault.

If the print file is successfully sent, a message is provided to the user to examine the output at the printer output bin. If there is a printout, but it does not appear correct, the printer is the problem. In the same manner, if there is no printout, the printer is also the problem.

As can be seen from the above, diagnostic procedure 34 initially assures that the print file has an appended diagnostic indicator which assures that the print file will be stored when it outputs from an intermediate data processing module in the chain of modules which handle the print file. That output data is then used to determine on which side of the respective checkpoint a fault resides. Diagnostic procedure 34 then moves to either side of the respective checkpoint and performs its fault diagnosis procedure as above indicated.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for enabling a diagnostic procedure to determine which of a plurality of data processing modules is at fault in a chain of data processing modules extending between an input and an output, said method comprising the steps of:

inputting a test file to said input, said test file having a diagnostic indicator appended;

operating said data processing modules to process said test file;

operating said diagnostic procedure to monitor operations in a selected data processing module that is positioned in said chain of data processing modules at a point intermediate a first data processing module in said chain and a last data processing module in said chain, said diagnostic procedure responding to said diagnostic indicator by causing an output of said selected data processing module to be stored in a memory test file; and determining if said memory test file exists and, if yes, further checking operations of data processing modules between said selected data processing module and said output and, if no, checking operations of data processing modules between said selected data processing module and said input.

2. A method for enabling a diagnostic procedure to determine which of a plurality of data processing modules is at fault in a chain of data processing modules extending between an input and an output, said method comprising the steps of:

inputting a test file to said input, said test file having a diagnostic indicator appended;

operating said data processing modules to process said test file;

operating said diagnostic procedure to monitor operations in a selected data processing module that is positioned in said chain of data processing modules at a point intermediate a first data processing module in said chain and a last data processing module in said chain, said diagnostic procedure responding to said diagnostic indicator by causing an output of said selected data processing module to be stored in a memory test file; and determining if said memory test file exists and, if yes, further checking operations of data processing modules between said selected data processing module and said output and, if no, checking operations of data processing modules between said selected data processing module and said input.

3. The method as recited in claim 2 wherein said test file is inhibited from further transmission along said chain of data processing modules, and is enabled to proceed only if no fault is found between said input and said selected data processing module.

4. A system for determining which of a plurality of data processing modules is at fault in a chain of data processing modules in a network printer system, said system comprising:

a host processor including a plurality of software modules for processing input data, said software modules including a queue control module, an inter-face module, and a network driver module;

a network interface hardware module for connecting said host processor to a network and printers connected to said network;

diagnostic module means present in said host processor for causing input to said queue control module of a test file, said test file including a diagnostic indicator, said diagnostic module means enabling said host processor to commence processing of said test file, said diagnostic module means monitoring an output of an intermediate selected software module to detect a presence of said diagnostic indicator, and upon detecting said diagnostic indicator, causing inhibition of further transfer of said test file and storage of said test file, said diagnostic module means thereafter determining if said test file is present and correct, and utilizing said determining to further decide which direction to further check for a fault.

* * * * *